(12) United States Patent  
Rahrer (10) Patent No.: US 7,913,277 B1
(45) Date of Patent: Mar. 22, 2011

(54) METADATA EXTRACTION AND RE-INSERTION AND IMPROVED TRANSCODING IN DIGITAL MEDIA SYSTEMS

(75) Inventor: Tim Rahrer, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 273 days.

(21) Appl. No.: 11/693,916

(22) Filed: Mar. 30, 2007

Related U.S. Application Data (60) Provisional application No. 60/743,983, filed on Mar. 30, 2006.

(51) Int. Cl.
  *H04N 7/10* (2006.01)
(52) U.S. Cl. .......... 725/36; 725/114; 725/116; 725/144; 725/146
(58) Field of Classification Search .............. 725/32–36, 725/54, 63–71, 114, 116, 144, 146
  See application file for complete search history.

(56) References Cited

U.S. PATENT DOCUMENTS

| | | | | |
|---|---|---|---|---|
| 6,314,111 B1* | 11/2001 | Nandikonda et al. | ......... | 370/473 |
| 6,477,706 B1* | 11/2002 | Hua et al. | ......... | 725/96 |
| 6,487,721 B1* | 11/2002 | Safadi | ......... | 725/36 |
| 6,804,827 B1* | 10/2004 | Furukawa et al. | ......... | 725/140 |
| 6,985,530 B1* | 1/2006 | Zerbe | ......... | 375/240.29 |
| 7,068,724 B1* | 6/2006 | Hamilton | ......... | 375/240.26 |
| 7,096,488 B1* | 8/2006 | Zhang et al. | ......... | 725/105 |
| 7,225,458 B2* | 5/2007 | Klauss et al. | ......... | 725/63 |
| 7,274,862 B2* | 9/2007 | Komori | ......... | 386/99 |
| 2001/0037500 A1* | 11/2001 | Reynolds et al. | ......... | 725/36 |
| 2001/0047517 A1* | 11/2001 | Christopoulos et al. | ......... | 725/87 |
| 2002/0083435 A1* | 6/2002 | Blasko et al. | ......... | 725/14 |
| 2002/0118679 A1* | 8/2002 | Eyer | ......... | 370/389 |
| 2002/0196850 A1* | 12/2002 | Liu et al. | ......... | 375/240.12 |
| 2003/0142129 A1* | 7/2003 | Kleven et al. | ......... | 345/744 |
| 2004/0240541 A1* | 12/2004 | Chadwick et al. | ......... | 375/240.01 |
| 2005/0021723 A1* | 1/2005 | Saperia | ......... | 709/223 |
| 2006/0067362 A1* | 3/2006 | Ramakrishnan | ......... | 370/468 |
| 2006/0075449 A1* | 4/2006 | Jagadeesan et al. | ......... | 725/113 |
| 2006/0253864 A1* | 11/2006 | Easty | ......... | 725/35 |
| 2009/0103607 A1* | 4/2009 | Bajpai et al. | ......... | 375/240.02 |

* cited by examiner

*Primary Examiner* — Scott Beliveau
*Assistant Examiner* — Nicholas T Corbo
(74) *Attorney, Agent, or Firm* — Kent Daniels; Blake, Cassels & Graydon LLP (57) ABSTRACT

A system, module and method is provided for metadata extraction and re-insertion. A module has a first input for receiving a compressed digital media stream having metadata such as DPI cues or content related information contained therein and an output for providing a first control signal including metadata information to an encoder. The metadata is extracted from the digital media stream by the module and generates a control signal including the metadata. The encoder module re-encodes the digital media contained in the digital media stream and re-inserts the metadata.

20 Claims, 4 Drawing Sheets

METADATA EXTRACTION AND RE-INSERTION AND IMPROVED TRANSCODING IN DIGITAL MEDIA SYSTEMS

CROSS-REFERENCE TO RELATED APPLICATIONS

This application claims the benefit of priority under 35 U.S.C. §119(e) to U.S. Provisional Application Ser. No. 60/743,983 filed Mar. 30, 2006, which is herein incorporated by reference in its entirety.

TECHNICAL FIELD

The present invention relates to digital media distribution systems, and in particular to methods and systems for metadata extraction and re-insertion and improved transcoding in digital media systems.

BACKGROUND

In digital media distribution systems, such as Multi-Service Operator (MSO) cable systems or Telco Internet Protocol Television (IPTV) systems, a program content feed is transmitted by a content owner to local media distributors for distribution to subscribers. Typically, the program content feed contains embedded cues to signal when local advertising program content may be inserted into the content feed. Additionally the program content feeds or video on demand (VoD) files may also employ embedded cues to signal when personalized or localized national level advertising may be inserted.

In traditional analog media distribution systems, such cues are provided as a predetermined inaudible analog tone. With the introduction of digitally encoded media, corresponding digital cues were developed, primarily based on the needs of MSO cable system operators. Some providers have attempted to introduce the analog cues into the digital systems by generating the analog cues based on the digital cues however, this approach sacrifices most of the information contained in the digital cues and falls back to the most primitive timing approaches, which is not suitable for some digital systems.

As additional digital encoding and transmission systems and formats (such as IPTV) have been deployed, the need for transcoding or re-encoding digital compressed media (e.g., to a lower bit rate to accommodate Telco access networks that have relatively limited available bandwidth) has raised a number of issues. One such issue is that the DPI cues relied on for insertion of local advertising content are frequently removed during the re-encoding process and are lost and unrecoverable. As a result, the distributors of digital media who must re-encode the digital compressed media have adopted a fall back position of performing ad insertion only on channels that still use analog cues which are not lost during re-encoding. Another issue is that the original program source metadata is lost when the media stream is re-encoded. In particular metadata pertaining to the content of the media stream is not available to the encoder that is re-encoding the media. As such, the encoder doing the re-encoding is not capable of producing digital compressed media that is at the quality level that would have been possible if performed directly by the original encoder.

Accordingly, methods and apparatus enabling metadata to survive re-encoding of the digital media remain highly desirable. Methods and apparatus that provide for improved transcoding of digital compressed media are also highly desirable.

SUMMARY

There is provided a method and apparatus for enabling metadata to survive re-encoding of digital media. The metadata may comprise Digital Program Insertion (DPI) cues and also include additional content specific metadata. The metadata may relate to content characteristics or programming related information for improving the transcoding quality and efficiency or provide information for use in determining what type of advertising content should be inserted in local markets.

In one aspect there is provided a module for metadata extraction from a digital media stream, the module comprising a first input for receiving a compressed digital media stream having metadata contained therein; and a first output for providing a first control signal including metadata information to an encoder, the encoder for re-encoding the digital media stream, wherein the module extracts the metadata contained in the digital media stream and generates the first control signal including metadata information provided at the first output.

In another aspect there is provided a method for metadata extraction and re-insertion in a digital media transmission system, the method comprising the steps of extracting metadata from an encoded digital media stream; generating a control signal including metadata of the digital media stream; and providing the control signal to an encoder for re-encoding content of the digital media stream and generating a re-encoded digital media stream.

In yet another aspect there is provided a digital media transmission system comprising a module for generating corresponding baseband and encoded streams in respect of a received digital media content feed; a module for receiving and processing the encoded stream to determine a respective location of metadata within the content feed and to generate a control signal containing the metadata; and a media encoder for receiving and encoding the baseband stream into a transport stream and receiving the control signal, the media encoder inserting a respective metadata into the encoded transport stream at each determined location.

Other aspects and features of the present invention will become apparent to those ordinarily skilled in the art upon review of the following description of specific embodiment of the invention in conjunction with the accompanying figures.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

A method and apparatus enabling metadata such, as Digital Program Insertion (DPI) cues and content description or program characteristics, to survive re-encoding of digital media and also enable improved transcoding of compressed digital media. Addition and subtraction of control signalling information in a media stream may be used as an input to downstream processing elements such as encoders via a management stack in order to improve output quality and features. As such, transcoding quality may be improved based on apriori knowledge of media stream characteristics and/or media stream content topic information may be exploited to enable insertion of related or relevant advertising ads.

National, non-network television programmers such as Discovery™, ESPN™, CNN™, etc. (i.e., traditionally called the "cable" channels) have identified time slots within their program feeds for local advertising. Typically, two or more minutes per hour are allocated to local ads with the locations of the ad times indicated by digital or analog cue signals placed 5-8 seconds before the insertion point. If the local television service provider chooses not to employ local ad insertion, the national advertisement is aired as normal. Usually the national advertisement that is played during the local ad insertion time is a Per Inquiry (PI) ad, which only generates revenue for the national programmer based on direct responses to the toll free phone numbers or web addresses shown in the advertisement. Therefore, billing is based on customer response and not the exact ad placement frequency or the specific time slot chosen. This provides the local television service providers flexibility in selling advertising for these identified time slots, if the providers so choose.

National broadcast networks such as ABC™, NBC™, CBS™, etc., typically have local affiliate stations that handle local advertising sales and placement. Therefore, ad insertion is typically not done by the service provider for national networks that have local affiliates. However, there are instances where local ads are inserted into national broadcast content, for example in regions outside of the network's reach such as for American broadcast networks being delivered to Canadian viewers where no local affiliate exists. Local television service providers (i.e., cable operators, Multi-Service Operators, and recently, telephone companies) may sell advertising space and insert the local ads in the place of the existing national ads and retain the generated advertising revenues. Additionally ad insertion cues may be used to locally insert personalized national-level advertising for either National broadcast networks or the cable channels.

As digital video encoding progressed encoding and transport methods were developed, such as MPEG-2 (Motion Pictures Expert Group-2) ISO 13818.1 or MPEG-4 AVC over an MPEG TS, ISO 13818.1, Amendment 3, 2004 Transport of AVC video data over ITU-T Rec. H.222.0 I ISO/IEC 13818-1 streams, new digital methods were needed to indicate ad insertion points and to enable communication between a network element that handled the ad insertion (e.g., a splicer) in the digital domain and one that stored the digital ad spots (e.g., an ad server). Industry groups developed three standards to support digital program insertion: ANSI/SCTE (American National Standards Institute/Society of Cable Telecommunications Engineers) 104 2004, which is an Automation System to Compression System Communications Application Programming Interface (API) and is hereby incorporated by reference in its entirety, ANSI/SCTE 30 2005, which is a Digital Program Insertion (DPI) Splicing API and is hereby incorporated by reference in its entirety, and ANSI/SCTE 35 2004, which is a DPI cueing message for cable and is herein incorporated by reference in its entirety. The SCTE 35 standard was adopted by the ITU as specification 3.181 related to cable networks and transmission of television, sound, program, and other multimedia streams. This forms the basis of the DPI solution. DPI offers flexibility, management, and importantly, the ability to drive advertising revenue through control of ad spot placement.

The standard used to insert the SCTE 35 DPI cue metadata into an MPEG-TS (Transport Stream) is ANSI/SCTE 104 2004. There are a number of major networks that already insert SCTE 35 DPI cues at the source prior to the satellite uplink distribution. As digital television distribution, and particularly high definition digital television distribution become standard, networks are increasingly adding SCTE 35 DPI cues into their MPEG Transport Streams.

The program channels that are enabled for ad insertion will contain digital cue messages as part of the MPEG-TS following the SCTE 35 standard. The SCTE 35 standard specifies a method of carrying information about upcoming splice points and other timing information within MPEG-TS. The construct of an information table is commonly used in the MPEG-TS and SCTE 35 extends this by defining a Splice Information Table (SIT) that is used to notify downstream devices of splice events for a program stream.

The Splice Information Table is carried using one or more Packet Identifiers (PIDs) referred to by that program's Program Map Table (PMT) which also identifies the audio, video and other data stream PIDs associated with the program. Input streams that carry SCTE 35 messages are typically assigned a Registration Descriptor using a SCTE_splice_format_identifier variable with a value of 0x43554549 (i.e., ASCII "CUEI") in the MPEG PMT. Using the information table and PMT constructs enables the splice notification events to pass through most MPEG-TS re-multiplexers without any special processing.

The Splice Information Table provides command and control information to the splicer, which generally parses the information and communicates to the ad server via SCTE 30 messages and waits for commands from the ad server. The Splice Information Table notifies the splicer in advance of the splice event. The notification may be sent multiple times. Splice events may be subsequently cancelled via SCTE 35 information.

Digital ad insertion brings with it some additional challenges over older analog approaches. While the analog insertion methods enabled simple seamless insertion of ad signals, creating seamless insertion on digital compressed video streams is not as straightforward. Compressed video streams use a sequence of encoded frames, referred to as Intra-coded (I-frames) and predictive coded (P- and B-frames) in a grouping called a Group of Pictures (GOP). The predictive coded P- and B-frames cannot be decoded without the corresponding reference I-frames. This limits the locations in a stream that an ad can be spliced into the I-frames; otherwise the insertion may disrupt a video decoder at a set-top box being used by a subscriber. I-frames occur at the beginning of a GOP, which are typically 12-15 frames in length. Therefore, the ad splicing points for seamless splicing occur at the beginning and end of GOPs. A digital seamless splicer must be quite sophisticated to be able to interpret GOPs and I-frame boundaries and must also be able to manage the capacity of a decoder's buffer to prevent underflow or overflow.

The MPEG-TS standard, as defined in document ISO 13818-1, defines a private data mechanism for carrying additional information associated with media streams. Typically, these are used to carry metadata to support Electronic Program Guide (EPG) functions with program updates, broadcast schedules, etc. However, additional private data may be carried in a number of ways as outlined in Annex H of the ISO 13818-1 MPEG Systems standard, which is hereby incorporated by reference in its entirety. Options for private data provided in Annex H include:

(a) Transport Stream Packet Table, where the data bytes of the transport_packet( )syntax may contain private data. Private data carried in this format is referred to as user private within the stream-type (Table 2-29). Transport Stream packets containing private data may also include adaptation-fields.

(b) Transport Stream Adaptation Field Table, where the presence of any optional private-data-bytes in the adaptation-field ( ) is signaled by the transport_private_data_flag. The number of the private-data-bytes is inherently restricted by the semantic of the adaptation-field-length field, where the value of the adaptation-field-length shall not exceed 183 bytes.

(c) PES packet Table, where there are two possibilities for carrying private data within PES packets. The first possibility is within the PES_packet_header, within the optional 16 bytes of PES_private_data. The presence of this field is signaled by the PES_private_data_flag. The presence of the PES_private_data_flag is signaled by the PES_extension_flag. If present, these bytes, when considered with the adjacent fields, shall not emulate the packet_start_code_prefix. The second possibility is within the PES_packet_data_byte field. This may be referred to as private data within PES packets under the stream-type (Table 2-29). This category of private data can be split in two: private_stream_1 refers to private data within PES packets which follow the PES_packet( ) syntax such that all fields up to and including, but not limited to, PES_header_data_length are present. Private_stream_2 refers to private data within PES packets where only the first three fields shall be present followed by the PES_packet_data_bytes containing private data. It is important to note that PES packets exist within both Program Streams and Transport Streams. Therefore, private_stream_1 and private_stream_2 exist within both Program Streams and Transport Streams.

(d) Descriptors—Descriptors exist within Program Streams and Transport Streams. A range of private descriptors may be defined by the user. These descriptors commence with descriptor_tag and descriptor_length fields. For private descriptors, the value of descriptor_tag may take the values 64-55 as identified in Table 2-39. These descriptors may be placed within a program_stream_map( ) (Table 2-29), a CA_section( ) (Table 2-27), a TS_program_map_section( ) (Table 2-28) and in any private_section( ) (Table 2-30). Specifically, private_data_bytes also appear in the CA_descriptor( ).

(e) Private Section—The private_section (Table 2-30) provides a further means to carry private data, also in two forms. This type of elementary stream may be identified under stream_type (Table 2-29) as private_data in PSI sections. One type of private_section( ) includes only the first five defined fields, and is followed by private data. For this structure the section_syntax_indicator shall be set to a value of '0'. For the other type, the section_syntax_indicator shall be set to a value of '1' and the full syntax up to and including last_section number shall be present, followed by private_data_bytes and ending with the CRC-32 (Cyclical Redundancy Check).

Figure 1:
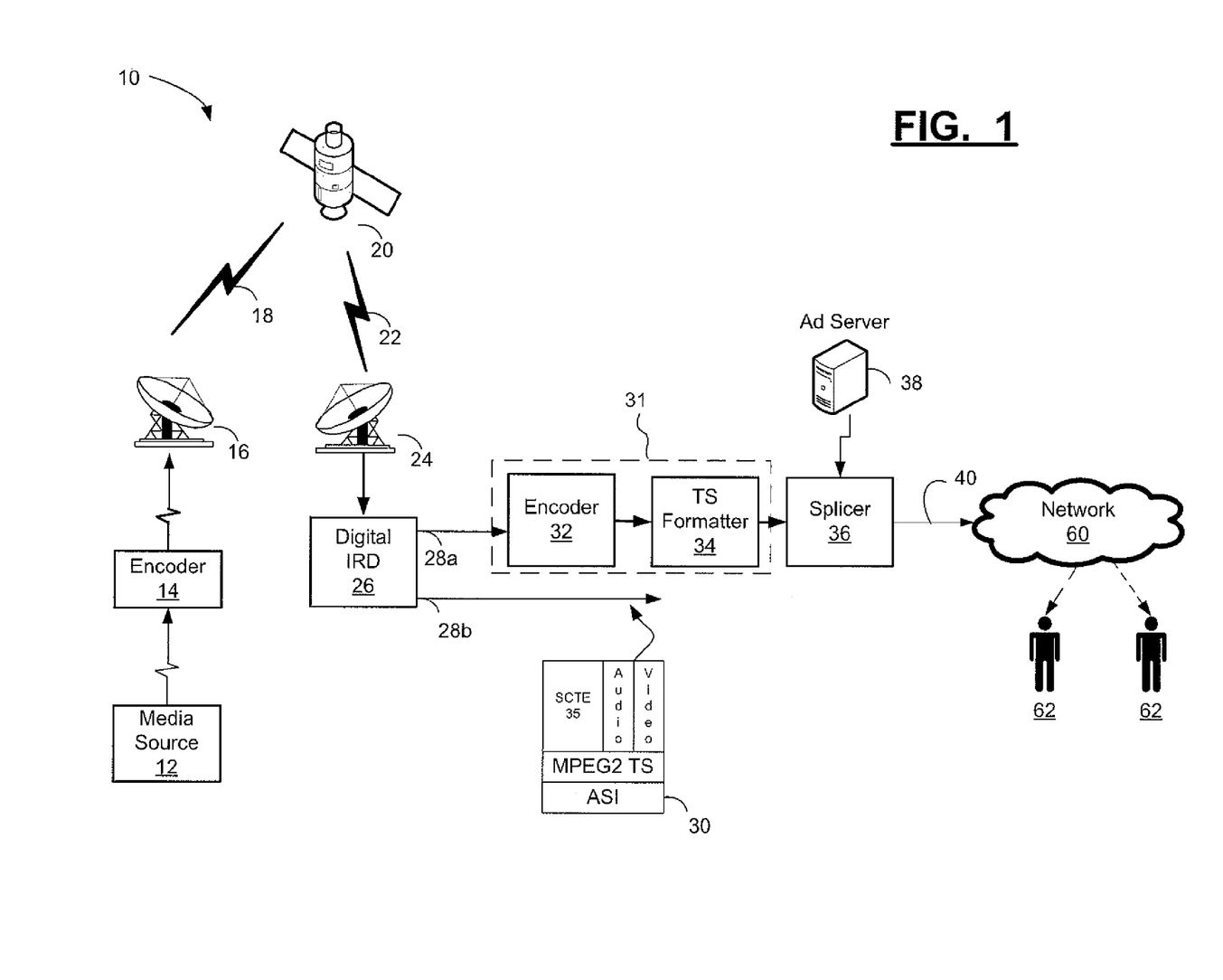
FIG. 1 shows in block diagram form a portion of a typical digital media distribution system.

Referring to FIG. 1, a block diagram is shown illustrating a portion of a typical digital media transmission or distribution system 10. The digital media distribution system 10 generally includes a media source 12 that provides a baseband media stream to a source encoder 14. The encoder 14 typically encodes the media stream into a compressed digital media stream format, which in one example may be either an MPEG-2 or MPEG-4 digital video data stream, also referred to as a digital media content feed. The encoder 14 also typically includes a transport stream (TS) formatter to format the MPEG-2 or MPEG-4 data stream into MPEG-TS format. The transport stream formatter may add SCTE 35 Digital Program Insertion (DPI) cues for use by a local television service provider. The hardware that provides the instructions to add advertising and/or SCTE 35 DPI cues at this point in the distribution (i.e., at the location of the major network that provides the content) is not shown and is well known to those skilled in the art. As described above, the SCTE 35 DPI cues provide the downstream television service provider with digital cues signalling where in the MPEG-TS the provider can insert local commercials or ad programming in a synchronized way that aligns with the ad existing programming and will not disrupt the decoders of subscribers who are watching programming contained in the MPEG-TS. The encoder 14 provides the MPEG-TS stream to a transmitter 16, such as a satellite dish, for distribution to the television service providers through a satellite 20 via a satellite uplink 18.

The television service providers receive the MPEG-TS from the network by way of a satellite downlink 22 using a satellite dish 24. It should be understood that although satellite distribution is discussed other distribution means such as fibre optic networks may be utilized. A digital Integrated Receiver-Decoder (IRD) 26 receives the MPEG-TS stream from the satellite dish 24 and typically outputs two output streams from two output ports 28*a* and 28*b*. The IRD 26 may have additional analog outputs (not shown). The digital IRD 26 resides at a video distribution head-end belonging to a television service provider and is responsible for recovering digital video and/or audio streams from the satellite downlink 22. The first output 28*a* provides an uncompressed digital baseband stream typically using a Serial Digital Interface (SDI) standard, which is generated by decoding the media contained in the MPEG-TS. Since the MPEG-TS is decoded, the associated transport stream information is discarded, which includes metadata such as the SCTE 35 DPI cues. The second output 28*b* provides a DVB-ASI (Digital Video Broadcasting Asynchronous Serial Interface) output, which is a consolidated SPTS (Single Program Transport Stream) that includes the MPEG-TS information structures called tables, previously mentioned, that provide information about the encoded video and audio streams. The SCTE 35 DPI ad insertion cues are carried in these tables, one of which is the Splice Information Table. Therefore, the content of the DVB-ASI output 28*b* is simply the MPEG-TS recovered from the satellite downlink 22 and includes the SCTE 35 DPI cues, which is represented in a table 30.

A television service provider will either distribute to subscribers the MPEG-TS stream provided by the output 28*b* or will re-encode the digital baseband stream provided by the output 28*a*. For example, television service providers typically re-encode digital television streams in order to decrease the bit-rate of the stream, such as when local distribution networks have limited available bandwidth. In such a situation, television service providers may choose, for example, to re-encode all 1080i based high-definition streams into 720p format, which typically requires less bandwidth and/or may use a different video encoding scheme offering improved compression compared to the encoder 14 used for the Media Source. This re-encoding is done using an encoder 31. The encoder 31 may be a embodied as a single device or as discrete modules or may be implemented in software. In FIG. 1 a separate encoder module 32 and TS Formatter 34 are shown. The encoder module 32 encodes the media stream and provides the encoded (e.g., MPEG Elementary Stream) stream to a TS formatter 34, which provides the MPEG-TS to a splicer 36. The splicer 36 is connected to an ad server 38, which is responsible for providing local ads that are to be spliced into the appropriate locations in the re-encoded MPEG-TS. The splicer 36 has an output 40 that provides the digital media for distribution to end users 62 through the distribution network 60 such as an IPTV network. However, the MPEG-TS provided to the splicer 36 lacks any SCTE 35 DPI cues that were in the original MPEG-TS provided by the downlink 22, or any additional content related metadata because the cues were lost when the IRD 26 decoded the MPEG-TS into the uncompressed digital baseband stream. Therefore, local television service providers that distribute re-encoded media have no way of accurately or reliably inserting local advertising into the MPEG-TS provided by the TS formatter 34.

There may be added hardware between the TS formatter 34 and the splicer 36, which is not shown. This additional hardware typically includes digital media servers that store the transcoded digital media until such time that the television service provider is ready to broadcast the digital media to end users. This digital media may be distributed in several locales, in which case there may be many splicers 36 and ad servers 38 inserting local advertising specific to each of the locales. These splicers and servers may be centrally located in a super head-end or may be distributed throughout the network, such as an IPTV network.

Figure 2:
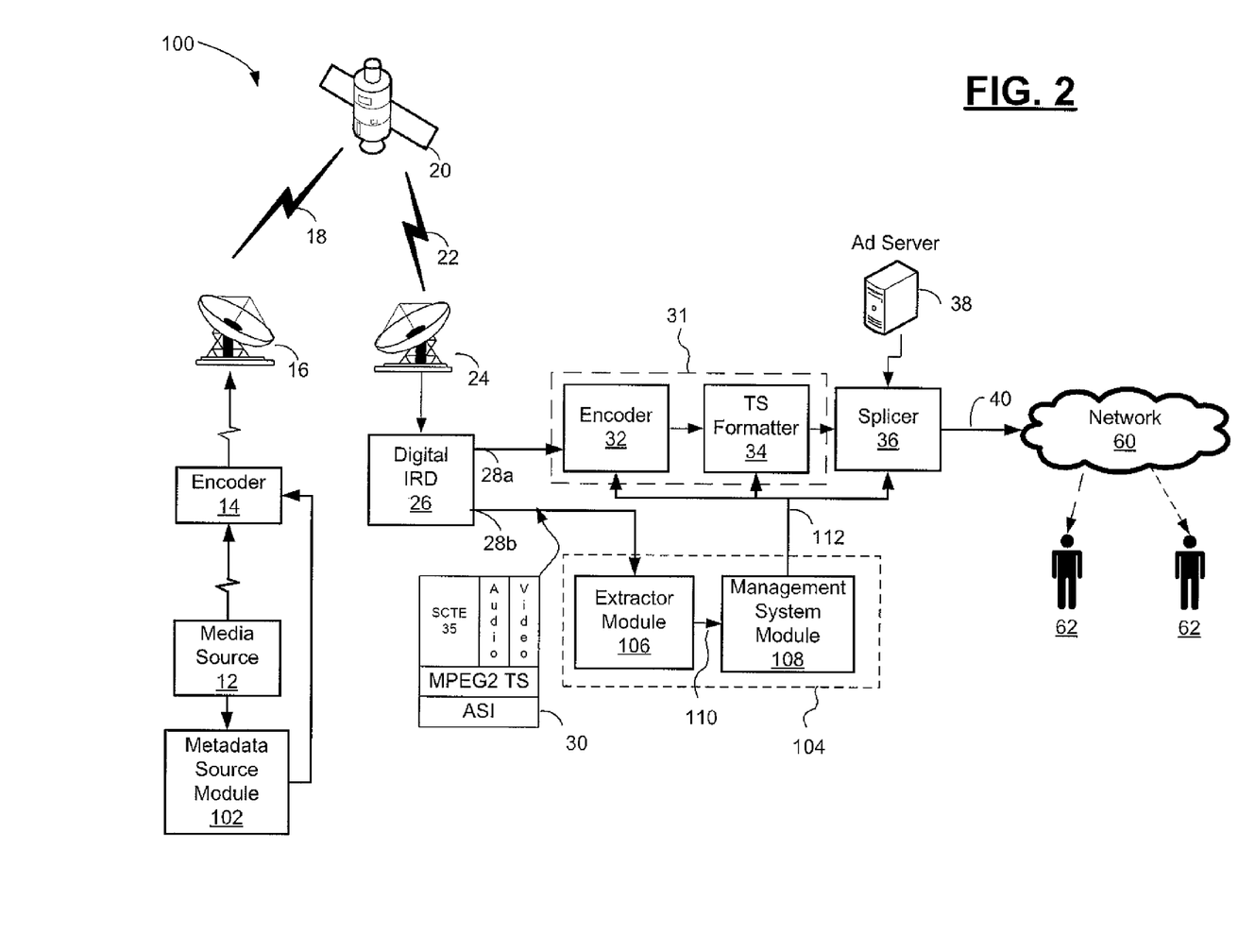
FIG. 2 shows in block diagram form a system for metadata extraction and re-insertion and improved transcoding in the digital media distribution system of FIG. 1.

Referring to FIG. 2, a block diagram is shown illustrating a system 100 for metadata extraction and re-insertion and to also provide improved transcoding in a digital media distribution system. Some of the modules of the system 100 are similar to that of the system 10 and are indicated with the same reference numerals as are used in FIG. 1. The system 100 shown in FIG. 2 differs from that of the system 10 shown in FIG. 1 in that the system 100 provides a metadata source 102 and a further processing module 104. The module 104 may, in one example, comprise an extractor module 106 and a management system module 108.

In addition to SCTE-35 tables, MPEG transport streams have a provision for carrying other types of signaling information in the private data channel, as described above. A mechanism similar to the proposed mechanism to recover SCTE-35 DPI cues in the ASI stream provided at the output 28b may be extended to include recovery of other control information to be passed over the management interface, to be described below, for use by the encoder (i.e., the encoder 32 and the TS formatter 34).

The metadata source 102 is coupled to the encoder 14 and, optionally, to the media source 12. The metadata source 102 may analyze the original baseband stream provided by the media source 12 or the encoder 14 and/or may analyze the compressed and encoded digital media stream (e.g., digital media content feed) provided by the encoder 14. The metadata source 102 may also exchange information with the encoder 14 related to any stage or pass of the coding process. The metadata source 102 supplies additional information to the encoder 14 (which includes a transport stream formatter) for adding to the digital media MPEG-TS supplied to the transmitter 16. In one example, the metadata source module 102 may be integrated into the encoder 14.

The information supplied by the metadata source 102 may include metadata such as information related to the video encoding process performed by the encoder 14, therefore allowing for a more efficient or higher quality encoding to be performed by downstream encoders, such as the encoder 32. Additionally, the metadata may include information related to the content of the media source 12, such as but not limited to electronic program guide information, demographic information or program topic information (e.g., car racing, soap opera, newscast, etc.), designed to aid local television service providers in selecting the appropriate type of advertising to add to a media stream when the media stream is locally distributed to end consumers. As further examples, the metadata source 102 may insert information into the MPEG-TS about the original content source provided by the media source 12, such as whether the original content source is film or video, standard definition or high definition, and actual resolutions, etc., and may be useful in setting the encoder/transcoder 32 preprocessing, filtering, and encoder settings. High definition materials may have been up-converted from lower resolutions and this knowledge may improve transcoding or re-encoding at the encoder 32. Other hints about scene complexity analysis performed by more sophisticated multi-pass encoder systems originally used at the encoder 14 may prove helpful to less complex single pass real time encoders (e.g., possibly the encoder 32) to improve quality. Additionally, the adjunct information to assist re-encoding at downstream encoders such as the encoder 32 may include but is not limited to, pre-processing settings, video encoding internal process variables, or hint tracks. Any of this information may be embedded in the MPEG-TS using the private data mechanism of MPEG-TS, as described above.

Since most digital IRDs, such as the IRD 26, support both SDI uncompressed baseband digital video (e.g., the output 28a) and DVB-ASI compressed video in an MPEG-TS (e.g., the output 28b) outputs, the present invention contemplates using both streams provided by the outputs 28a and 28b to create a re-encoded or transcoded MPEG-TS that preserves the original metadata including DPI cues provided in the MPEG-TS supplied by the source encoder 14 and delivered via the satellite downlink 22. As shown in FIG. 2, the SDI stream provided by the output 28a is routed to the encoder 32 to re-encode the media at the appropriate bit-rate, resolution, and broadcast standard (e.g., 480i, 480p, 720p, or 1080i, etc.) required by the particular television service provider that will distribute the stream to subscribers. The DVB-ASI stream provided by the output 28b that contains the complete MPEG-TS with the SCTE 35 DPI cues is routed to an input of the module 104, which in one example comprises a metadata extraction apparatus. In one example, the module 104 includes the extractor module 106 and the management system module 108.

The extractor module 106 extracts the information metadata such as for example SCTE 35 DPI cue tables for analysis and also extracts additional metadata contained in the private data mechanism of the MPEG-TS stream for analysis. The extractor module 106 provides a control signal 110 to the management system module 108 that includes all of the extracted information. The extractor module 106 may be independent embodied or incorporated in hardware or software as part of the digital IRD 26 or encoder 32. The control signal 110 may be, for example, an SNMP (Simple Network Management Protocol) message that is transferable over any network connection, such as an Ethernet or Internet based network. The management system module 108 may be an encoder management system that is responsible for managing and/or controlling a bank of encoders, such as the encoder 32 (and associated transport stream formatters 34) in a digital media distribution head-end, since typically one encoder 32 and one transport stream formatter 34 are used for each television channel, and may be embodied in software or hardware either operating independently or incorporated in other systems of the receive chain. The management system module 108 provides a control signal 112 to the encoder 32 and/or the TS formatter 34 and/or the splicer 36. The control signal 112 may be, for example, an SNMP message that is transferable over any network connection, such as an Ethernet or Internet based network. The extractor module 106 may also include a recovery mechanism to extract any analog tones and convert the analog tones to digital format for re-insertion in the transcoded MPEG-TS generated by the encoder 31. In this way, all downstream splicers may be fully digital and no additional analog hardware would be required.

The management system module 108 provides an additional function of controlling the re-insertion metadata such as the DPI cues at the TS formatter 34 into the newly re-encoded MPEG data stream provided by the encoder 34 such that the re-encoded or transcoded MPEG-TS provided by the TS formatter 34 includes all of the original DPI cue information that was found in the original MPEG-TS received from the satellite downlink 22. This enables the splicer 36 to accurately and reliably insert local ads supplied to it by the ad server 38 when the re-encoded MPEG-TS is distributed to end users. The management system module 108 may also be utilized to provide the additional metadata information contained in the private data mechanism of the MPEG-TS to the encoder 32 and/or the TS formatter 34 and/or the splicer 36. The encoder 32 and the TS formatter 34 may use information (e.g., metadata) originally derived from the encoding process performed at the source encoder 14 to improve the efficiency and/or quality of the transcoding performed by the encoder 32 and the TS formatter 34. The splicer 36, in conjunction with the ad server 38, may use information provided by the metadata source module 102 to choose suitable local advertising when delivering the media to the subscribers. Additionally, the metadata may be re-inserted into the private data fields of the transcoded MPEG-TS by the TS formatter 34 under control of the Management System Module 108, for use by downstream advertisement splicers to better target local advertising.

Existing DPI monitoring hardware may be utilized as the extractor module 106 with suitable software additions and/or modifications to enable the DPI monitoring hardware to provide the DPI cue information, such as SCTE 35, and the additional information in the control signal 110, which may be an SNMP message output. Similarly existing media encoder management systems may be used as the management system module 108 with suitable software additions and/or modifications to enable the management system 108 to provide the metadata information to the TS formatter 34 and the additional information to the suitable destinations (e.g., the encoder 32, the TS formatter 34, and/or the splicer 36) using the control signal 112, which may be an SNMP message output. Existing media encoder and TS formatter systems may also be utilized with suitable software additions and/or modifications to enable the TS formatter 34 to insert SCTE 35 standard (or other format) digital cues into the encoded media streams based on the SCTE 104 application programming interface (or other interface) between control systems and encoders. Existing media encoder systems may also be utilized with suitable additions to enable the encoder 32 to perform more efficient and higher quality encoding using the metadata originally derived from the encoding process performed by the encoder 14.

Alternatively, the extractor module 106 may be suitably programmed to generate and provide the control signal 112 directly to the encoder 32, the TS formatter 34, and/or the splicer 36 without the use of the management system module 108. In another example, a rack encoder housing the encoder 32 and TS formatter 34, if designed with enough processing power, could be programmed to directly accept the DVB-ASI stream provided by the output 28b and perform the function of the module 104 internally. The rack encoder could then re-insert the extracted metadata including SCTE 35 DPI cue information into the transcoded stream, use the additional metadata to perform higher quality or more efficient encoding, and deliver information to be used by the splicer 36. In yet another example, the management system module 108, if provided with enough processing power, could be programmed to accept the DVB-ASI stream provided by the output 28b and perform the function of the extractor module 106 internally. The management system module 108 may further control the re-insertion of the metadata at the TS formatter 34 into the newly re-encoded MPEG data stream provided by the encoder 32, by providing the control signal 112 to the TS formatter 34. The management system module 108 may further provide the additional information destined for any of the encoder 32, the TS formatter 34, and/or the splicer 36 to the appropriate destinations, using the control signal 112. In yet another example, the digital IRD 26, if provided with enough processing power, could be programmed to perform the function of the extractor module 106 directly on the DVB-ASI stream and provide the control signal 110 on a third output (not shown) directly to the management system module 108.

Similarly, it should be understood that components of FIG. 2 can also be applicable to downloadable or streaming media for on-line or internet-based video service providers. The system configuration can be modified for media delivery in internet based media delivery applications from the service provider to an end user rather than satellite delivery as shown. In addition, re-encoding may occur at the content provider depending on the application. The digital IRD receiver 26, may be any form of receiver for receiving the media before distribution to the end users and should not be limited to a digital IRD. The receiver may be located at the premises of the content provider or located regional at the service providers and may embodi modules for performing the encoder 31 and metadata module 104 function as well as program insertion via a splicer function 36. Program insertion could also be performed at a region/local local level and possible be performed on a targeted or individual user basis. In addition the output stream 28a and 28b may utilize any digital format compatible with metadata extraction.

Although MPEG-TS is disclosed and form of structure transport stream that provides for metadata transport may be utilized. In addition any compression technique may be used on the media stream content contained within the transport stream. The re-encoding process include re-encoding the digital media from one format or compression format to another compression format potentially at differing compression rates.

Figure 3:
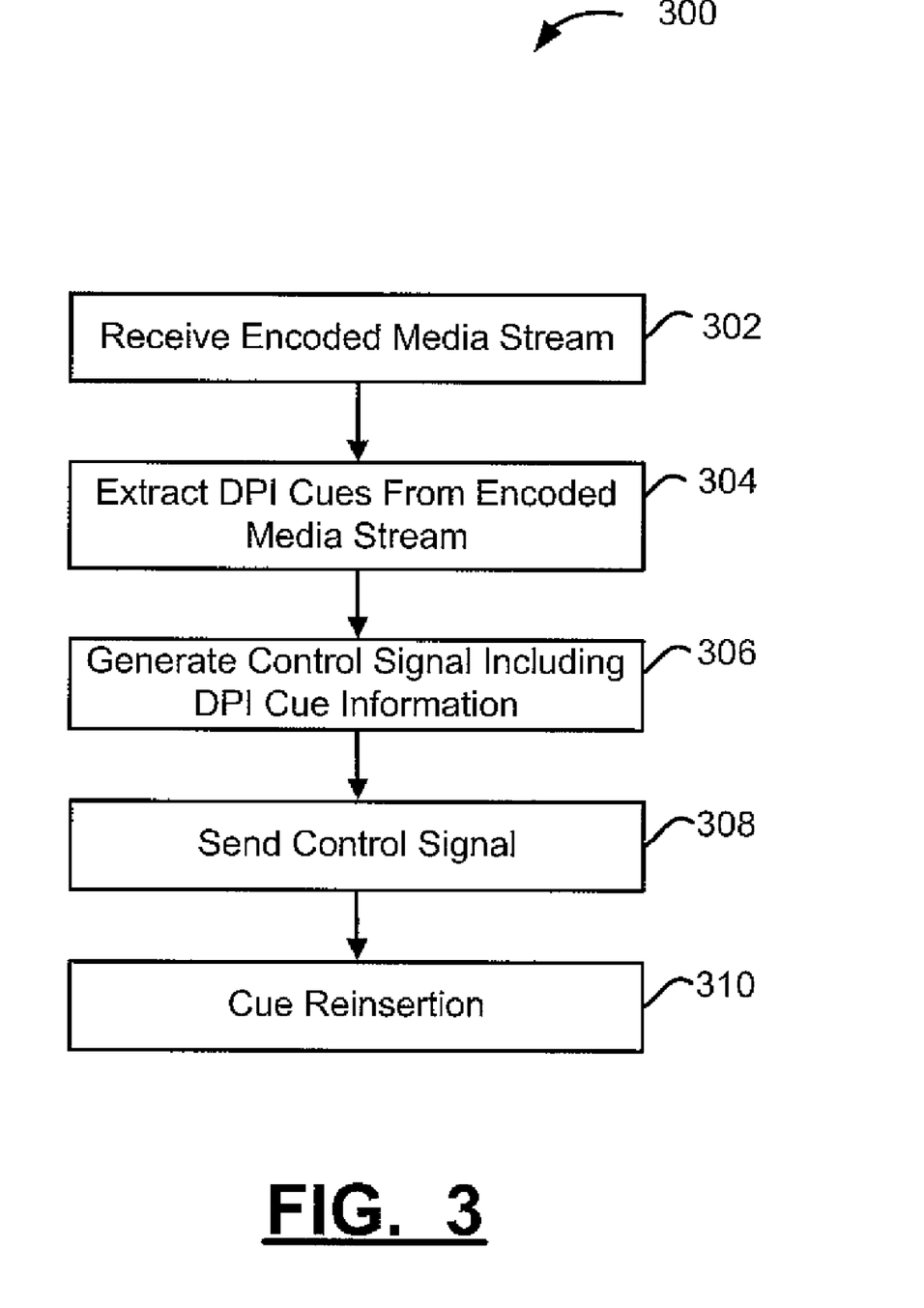
FIG. 3 shows in flow chart form a method for implementing metadata extraction and reinsertion in a digital media distribution system.

Referring to FIG. 3, a flow chart is shown illustrating a method 300 for implementing the DPI cue extraction and reinsertion in a digital media distribution system, as described above. The method commences with the reception of the media stream at the IRD 26 at a step 302. Next, at a step 304, the DPI cues are extracted from the encoded media stream (e.g., the DVB-ASI output 28b of the IRD 26 supplying the encoded stream, with the extraction occurring in the module 104). In a next step 306, a control signal is generated including the extracted DPI cue information (e.g., the control signal 112). Next, at a step 308, the control signal is provided to the transport stream formatter (e.g., the control signal 112 provided by the module 104 to the TS formatter 34). In a final step 310, the DPI cues are re-inserted into the newly encoded media stream (e.g., the TS formatter 34 inserts the cues into the MPEG data stream generated by the encoder 32). The steps that occur within the module 104 are not explicitly described within the method 300 because, as described above, the functions of the modules 106 and 108 may be implemented in numerous ways using virtually any of the components 26, 104, 106, 108, 32, and 34, if the system is suitably designed and programmed according to the design criteria of a particular application. The configuration shown in FIG. 2 within the module 104 is intended to be an exemplary embodiment only and is not intended to limit the scope of the present invention.

Figure 4:
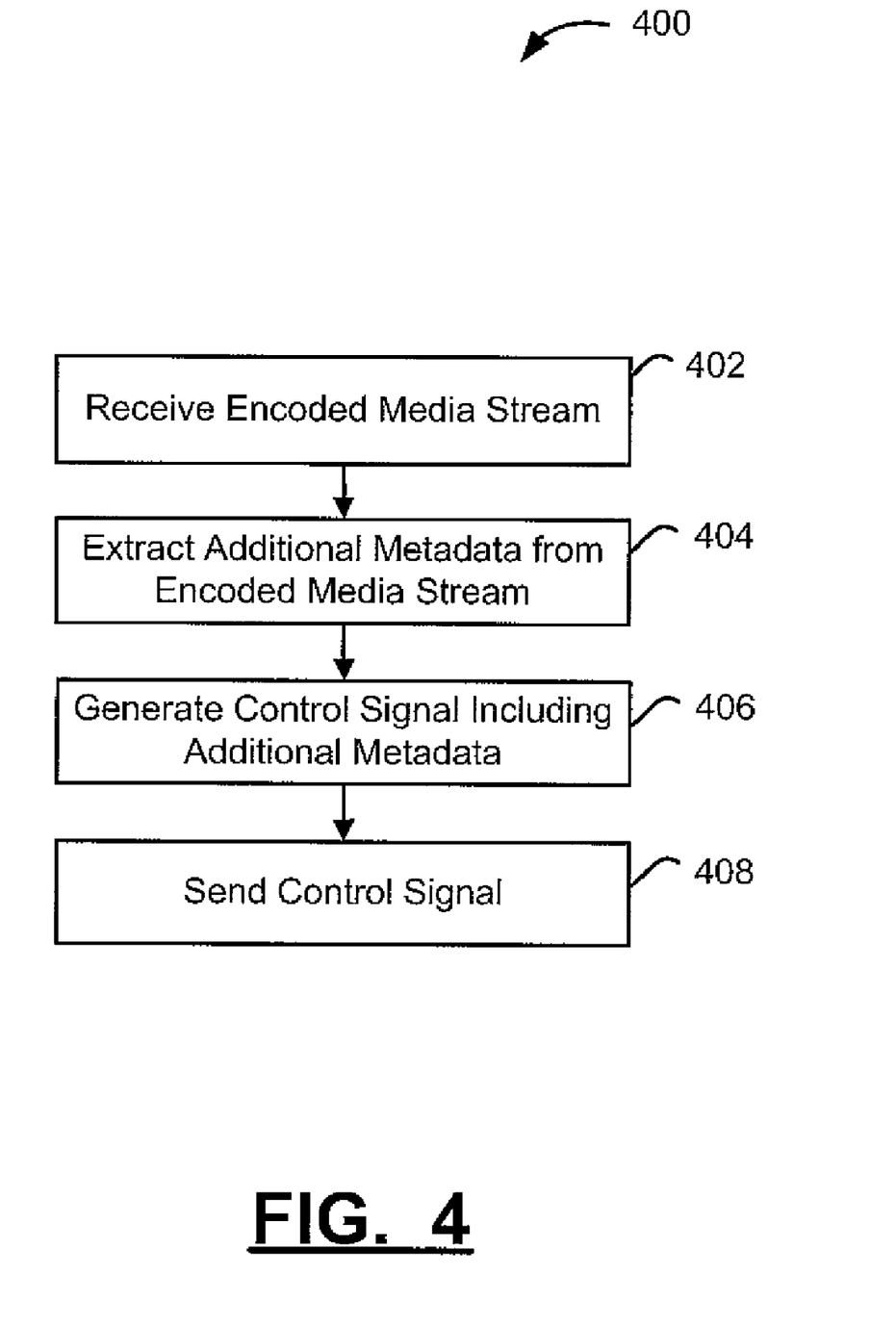
FIG. 4 shows in flow chart form a method for implementing improved transcoding in a digital media distribution system.

Referring to FIG. 4, a flow chart is shown illustrating a method 400 for improved transcoding in a digital media distribution system using metadata provided in the media stream, as described above. At step 402, the method commences with the reception of the encoded media stream is received. The received media stream includes additional information or metadata that is added to the encoded stream of the media content feed (e.g., additional metadata provided by the metadata source module 102 added to the encoded media source at the source encoder 14, as described in detail above) prior to transmission. In a next step 404, the additional information is extracted from the encoded stream (e.g., by the module 104). Next, at a step 406, a control signal is generated including the additional information of the encoded stream (e.g., the control signal 112 generated by the module 104). In the case where both the methods 300 and 400 are being executed together in the system 100, the control signal 112 may contain both the additional information and the DPI cue information of the method 300. Next, at a step 408, the control signal is provided to the intended modules (e.g., any of the encoder 32, the TS formatter 34, and the splicer 36). As described above, the encoder 32 and the TS formatter 34 may use information originally derived from the encoding process performed at the source encoder 14 to improve the efficiency and/or quality of the transcoding performed by the encoder 32 and the TS formatter 34. The splicer 36, in conjunction with the ad server 38, may use demographic information provided by the metadata source module 102 to choose suitable local advertising when delivering the media to the subscribers. Again, the steps that occur within the module 104 are not explicitly described within the method 400 because, as mentioned above, the functions of the modules 106 and 108 may be implemented in numerous ways using virtually any of the modules 26, 104, 106, 108, 32, and 34, if the system is suitably designed and programmed according to the design criteria of a particular application. The configuration shown in FIG. 2 within the module 104 is intended to be an exemplary embodiment only and not intended to limit the scope of the present invention.

The embodiment(s) of the invention described herein is(are) intended to be representative only. The scope of the invention is therefore intended to be limited solely by the scope of the appended claims.

The invention claimed is:

1. A processor for extracting and re-inserting metadata in a digital media transmission system, the processor comprising:
a digital Integrated Receiver-Decoder (IRD) for receiving a digital media stream in a compressed digital media stream format, and for generating: an uncompressed digital baseband stream including media content of the received digital media stream and not including the metadata; and a corresponding encoded digital media stream including both the media content of the received digital media stream and the metadata;
a metadata extractor for extracting the metadata from the encoded digital media stream and outputting a first control signal including the metadata; and
an encoder connected to receive the uncompressed digital baseband stream and the first control signal, the encoder re-encoding the uncompressed digital baseband stream to generate a transcoded digital media stream including the metadata.

2. The processor according to claim 1, wherein the metadata extractor further comprises:
an extractor module coupled for extracting the metadata contained in the encoded digital media stream and for generating a second control signal containing the extracted metadata; and
a management system module for receiving the second control signal and generating the first control signal.

3. The processor according to claim 2, wherein the metadata comprises Digital Program Insertion (DPI) cues used to signal locations to insert advertising materials.

4. The processor according to claim 3, wherein the metadata is selected from the group consisting of content title, content subject matter, content rating, scene description, and demographic information about expected viewers of the content or scenes within the content for re-insertion to the re-encoded digital media stream for use by splicers and ad servers of service providers to choose appropriate advertising to be inserted at the location of each DPI cue.

5. The processor according to claim 2, wherein the digital media stream is an MPEG-TS (Motion Picture Experts Group Transport Stream) compliant media stream.

6. The processor according to claim 5, wherein the encoded digital media stream is a Digital Video Broadcasting Asynchronous Serial Interface (DVB-ASI) stream.

7. The processor according to claim 6, wherein the first control signal and the second control signal are each selected from the group consisting of SNMP (Simple Network Management Protocol) messages carried over a network connection and SCTE 104 API (Society of Cable Telecommunications Engineers 104 Application Programming Interface) messages carried over a network connection.

8. The processor according to claim 2 wherein the metadata is selected from the group consisting of information about the original media source, information about whether the original media source is film or video, information about the original media source resolution, information about scene complexity analysis performed by a source encoder on the original media source, pre-processing settings used on the original media source, video encoding internal process variables, and encoding hint tracks.

9. A method for metadata extraction and re-insertion in a digital media transmission system, the method comprising:
a digital Integrated Receiver-Decoder (IRD) receiving a digital media stream in a compressed digital media stream format, and generating: an uncompressed digital baseband stream including media content of the received digital media stream and not including the metadata; and a corresponding encoded digital media stream including both the media content of the received digital media stream and the metadata;
a metadata extractor extracting the metadata from an encoded digital media stream, and generating a control signal including the metadata; and
an encoder re-encoding content of the uncompressed digital baseband stream to generate a transcoded digital media stream including the metadata.

10. The method of claim 9 further comprising the step of: inserting the metadata into the re-encoded media stream during transport stream formatting.

11. The method according to claim 10, wherein the metadata comprises Digital Program Insertion (PDI) cues used to signal locations to insert advertising materials.

12. The method according to claim 10, wherein the metadata is provided to the encoder for improving the quality of the re-encoded digital media stream, the metadata being selected from the group consisting of information about original content of the media stream, information about whether the original media source is film or video, information about the original media source resolution, information about scene complexity analysis performed by a source encoder on the original media source, pre-processing settings, video encoding internal process variables, and encoding hint tracks.

13. The method according to claim 10 wherein the control signal to the encoder is sent by SNMP messaging over a network connection.

14. A digital media transmission system comprising:
a digital Integrated Receiver-Decoder (IRD) for receiving a digital media content feed in a compressed digital media stream format, and for generating: an uncompressed digital baseband stream including the media content of the received compressed digital media stream and not including the metadata; and a corresponding encoded stream including both the media content of the received digital media stream and the metadata;
a metadata extractor for receiving and processing the encoded stream to determine locations of metadata within the content feed and to generate a control signal containing the metadata; and
a media encoder for re-encoding the uncompressed digital baseband stream into a transcoded stream and receiving the control signal, the media encoder inserting the metadata into the transcoded stream at each determined location.

15. The system according to claim 14, further comprising:
a media source connected to a source encoder, the source encoder encoding a media source stream and providing the digital media content feed; and
a metadata source module coupled to the source encoder, the metadata source module in communication with the source encoder and configured to provide the source encoder with instructions to add metadata to the digital media content feed during encoding.

16. The system according to claim 15, wherein the metadata extractor is configured to extract Digital Program Insertion (DPI) cues used to signal locations to insert advertising materials.

17. The system according to claim 16, wherein the metadata is selected from the group consisting of content title, content subject matter, content rating, scene description, and demographic information about expected viewers of the content or scenes within the content for use by splicers and ad servers of service providers to choose appropriate advertising to be inserted at the location of each DPI cue.

18. The system according to claim 15, wherein the metadata extractor further extracts the metadata from the encoded stream and includes the metadata in the control signal provided to the media encoder, the media encoder using the metadata for improved operation over what would be possible without the metadata, wherein the metadata is selected from the group consisting of information about the original media source, information about whether the original media source is film or video, information about the original media source resolution, information about scene complexity analysis performed by a source encoder on the original media source, pre-processing settings, video encoding internal process variables, and encoding hint tracks.

19. The system according to claim 15, wherein the digital media content feed is an MPEG-TS (Motion Picture Experts Group Transport Stream) and the metadata is included in the transport stream for carrying additional information related to the digital media content feed.

20. The system according to claim 15, wherein the uncompressed stream is a Serial Digital Interface (SDI) stream and the encoded stream is a Digital Video Broadcasting Asynchronous Serial Interface (DVB-ASI) stream.

* * * * *